United States Patent
Benini

(10) Patent No.: US 10,666,423 B2
(45) Date of Patent: May 26, 2020

(54) BIOMETRIC VERIFICATION OF A BLOCKCHAIN DATABASE TRANSACTION CONTRIBUTOR

(71) Applicant: AWARE, INC., Bedford, MA (US)

(72) Inventor: David Benini, Manchester, MA (US)

(73) Assignee: AWARE, INC., Bedford, MA (US)

( * ) Notice: Subject to any disclaimer, the term of this patent is extended or adjusted under 35 U.S.C. 154(b) by 189 days.

(21) Appl. No.: 15/753,879

(22) PCT Filed: Sep. 8, 2016

(86) PCT No.: PCT/US2016/050660
§ 371 (c)(1),
(2) Date: Feb. 20, 2018

(87) PCT Pub. No.: WO2017/044554
PCT Pub. Date: Mar. 16, 2017

(65) Prior Publication Data
US 2019/0013931 A1     Jan. 10, 2019

Related U.S. Application Data

(60) Provisional application No. 62/217,551, filed on Sep. 11, 2015.

(51) Int. Cl.
*H04L 9/32*     (2006.01)
*H04L 9/00*     (2006.01)
(Continued)

(52) U.S. Cl.
CPC ........ *H04L 9/0637* (2013.01); *G06F 16/2379* (2019.01); *H04L 9/006* (2013.01);
(Continued)

(58) Field of Classification Search
CPC .. H04L 9/006; H04L 2209/56; G06F 16/2379
See application file for complete search history.

(56) References Cited

U.S. PATENT DOCUMENTS 6,401,206 B1 * 6/2002 Khan .................... H04L 9/3231
                                             713/176
9,237,018 B2 * 1/2016 Popowski ............. H04L 9/3231
(Continued)

OTHER PUBLICATIONS

Breebaart, Jeroen, et al. "A reference architecture for biometric template protection based on pseudo identities." BIOSIG 2008: Biometrics and Electronic Signatures (2008). (Year: 2008).*
(Continued)

*Primary Examiner* — Madhuri R Herzog
(74) *Attorney, Agent, or Firm* — Jason H. Vick; Sheridan Ross, PC

(57) ABSTRACT

A blockchain database employs cryptography and other methods to implement and protect a distributed, publicly-amendable ledger. Transactions in a blockchain ledger are intentionally anonymous; however, there are cases where it would be useful to be able to verify or disprove a claim of identity of a contributor of a blockchain transaction. Biometrics can be used to link a human being to digital information using their unique physical traits in a way that is analogous to a handwritten or digital signature. An exemplary embodiment disclosed herein describes methods to create and store data in a blockchain transaction such that it can be used in the future to biometrically verify the identity of the contributor of the transaction, and use encoded biometric data to determine whether the blockchain transaction was created or not created by a particular individual.

7 Claims, 9 Drawing Sheets

(51) Int. Cl.
H04L 9/30 (2006.01)
H04L 9/06 (2006.01)
G06F 16/23 (2019.01)

(52) U.S. Cl.
CPC .......... *H04L 9/3033* (2013.01); *H04L 9/3073* (2013.01); *H04L 9/3231* (2013.01); *H04L 2209/56* (2013.01)

(56) References Cited

U.S. PATENT DOCUMENTS

| | | | |
|---|---|---|---|
| 2015/0244690 A1 | 8/2015 | Mossbarger | |
| 2015/0262171 A1 | 9/2015 | Langschaedel et al. | |
| 2015/0262172 A1* | 9/2015 | Rebernik | G06Q 20/065 705/71 |

OTHER PUBLICATIONS

Kevenaar, Tom, et al. "A reference framework for the privacy assessment of keyless biometric template protection systems." BIOSIG 2010: Biometrics and Electronic Signatures. Proceedings of the Special Interest Group on Biometrics and Electronic Signatures (2010). (Year: 2010).*
Buchmann, Nicolas, et al. "Security considerations on extending PACE to a biometric-based connection establishment." 2013 International Conference of the BIOSIG Special Interest Group (BIOSIG). IEEE, 2013. (Year: 2013).*
Breebaart, Jeroen, et al. "Biometric template protection." Datenschutz and Datensicherheit-DuD 33.5 (2009): 299-304. (Year: 2009).*
International Preliminary Report on Patentability for International Application No. PCT/US2016/050660, dated Mar. 22, 2018.
Antonopoulos, Andreas M. "Mastering Bitcoin: Unlocking Digital Cryptocurrencies" O'Reilly Media; Dec. 1, 2014 (298 pages).
International Standard ISO/IEC 24745 Information Technology—Security Techniques—Biometric Information Protection: Jun. 15, 2011 (58 pages).
Ken Shirriff's Blog "Bitcoins the Hard Way: Using the Raw Bitcoin Protocol" Available at http://www.righto.com/2014/02/bitcoins-hard-way-using-raw-bitcoin.html; Feb. 2014.
International Search Report for International Application No. PCT/US2016/050660, dated Dec. 13, 2016.
Written Opinion for International Application No. PCTIUS2016/050660, dated Dec. 13, 2016.
Office Action for European Application No. 16767457.1, dated Nov. 8, 2019.

* cited by examiner

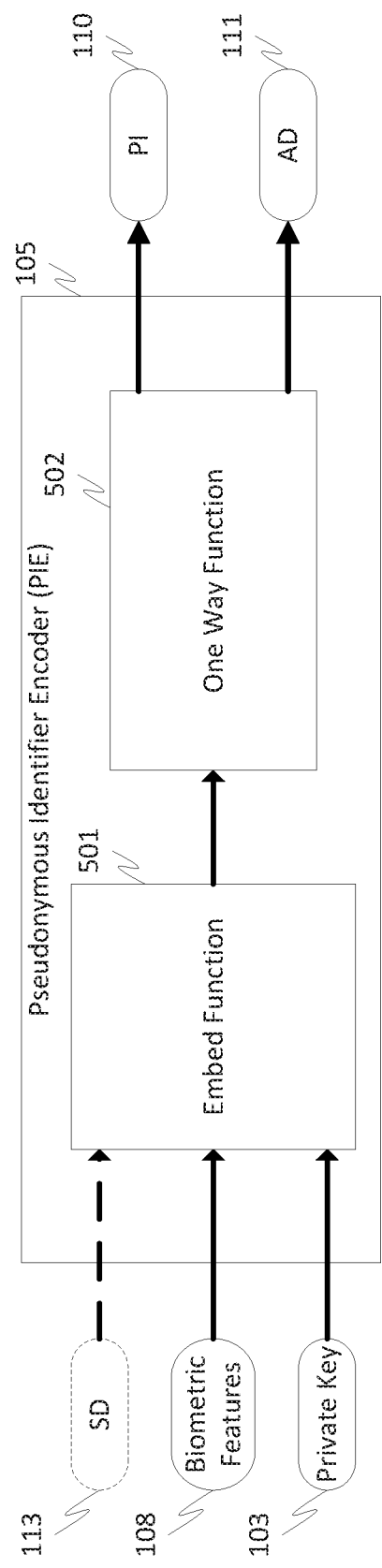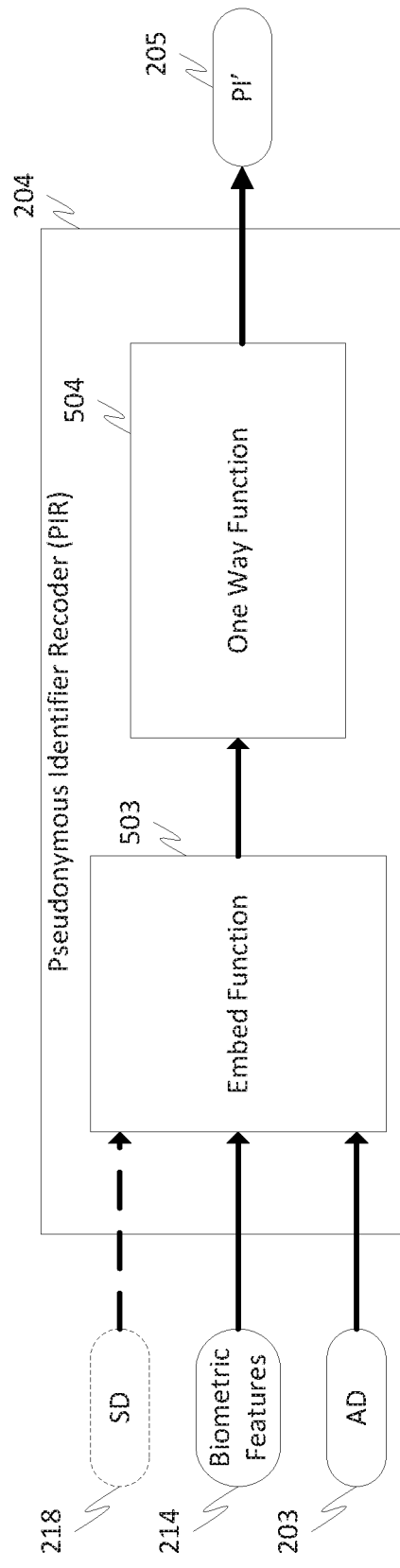

BIOMETRIC VERIFICATION OF A BLOCKCHAIN DATABASE TRANSACTION CONTRIBUTOR

CROSS REFERENCE TO RELATED APPLICATION

This application is a national stage application under 35 U.S.C. 371 of PCT Application No. PCT/US2016/050660, filed Sep. 8, 2016, which designated the United States, which PCT application claims the benefit of and priority under 35 U.S.C. § 119(e) to U.S. Provisional Application Ser. No. 62/217,551, filed Sep. 11, 2015, of the same title, each of which are incorporated herein by reference in their entirety.

FIELD

An exemplary embodiment relates generally to a blockchain database and particularly to the use of biometrics to enroll and/or verify a blockchain database transaction contributor.

BACKGROUND

As computers and the internet progressively become more central to everyday transactions, the importance of security and privacy becomes increasingly vital. A strong and efficient authentication method is an increasingly important feature of any digital system. The use of biometrics—a way of identifying an individual based on physiological and/or behavioral characteristics—in addition to conventional methods of digital security provides an added layer of protection. Embodiments of the present disclosure address disadvantages and issues with previous methods of authenticating transactions in a blockchain ledger with improved system and methods.

An important feature of biometric information protection algorithms and schemes is the ability to encode messages within the encoded data that may be decoded only when a biometric is successfully matched to the biometric used to encode the message.

A blockchain database employs cryptography and other methods to implement and protect a transaction ledger, to which transactions can be added but not edited without detection. A transaction ledger may be public and distributed or private. Blockchain databases are highly resistant to tampering because of their cryptographic tamper detection mechanisms. A transaction ledger utilizing a blockchain database has applications in cryptocurrencies, banking, payments, smart contracts, and other applications.

While a key feature of a blockchain database is the anonymity of the humans contributing transactions, there are applications in which it may be useful to have the ability, with the cooperation of a contributor, to demonstrate the contributor's association with one or more transactions in a transaction ledger. It is also conceivable that a user may seek to repudiate a purported role as a contributor to a transaction.

Bitcoin is a payment system that serves as an example of the creation and use of a blockchain database. U.S. Patent Publication No. 2015/0262171 discusses Bitcoin and blockchain technology in detail and is expressly incorporated herein by reference in its entirety. In order to conduct bitcoin transactions, a cryptographic public/private key pair is generated by a user. The private key is held solely by the contributor (e.g. in a "wallet software") and used to claim bitcoins. An "address" is a hash of the public key, and is noted in each bitcoin exchange, serving like an account number. A contributor may have different addresses for each transaction to enhance their anonymity in the transaction ledger. Bitcoins are passed from address to address with each transaction. The private key is also used to create a digital signature of the transaction. The public key is included in the transaction. These enable someone to verify that the contributor of the transaction is the holder of the associated private key via cryptographic challenge and response. If the private key is lost or stolen, however, the claim to a transaction may also be lost or stolen.

Transactions in a blockchain ledger are intentionally anonymous, ideally containing no personally identifiable information (hereinafter "PII"). There are cases, however, where it would be useful to be able to verify or disprove a claim of identity of a purported contributor of a blockchain transaction without requiring PII to be stored in the transaction.

Biometrics can be used to unambiguously link a human being to digital information using their unique physical traits in a way that is analogous to a handwritten signature or digital signature. Biometric data protection techniques enable this to be done in a way that anonymizes biometric data, preventing it from being useful for fraud in the event it is compromised. These techniques also enable encoding of messages that can only be decoded when a biometric match is achieved. The use of biometrics in addition to conventional, digital security methods adds an organic level of protection not possible through the use of computer processes alone.

These and other needs are addressed by the various embodiments and configurations discussed herein. One exemplary embodiment is directed generally to a blockchain database and particularly to the use of biometrics to enroll and/or verify a blockchain database transaction contributor.

BRIEF DESCRIPTION OF THE DRAWINGS

The present disclosure is described in conjunction with the appended figures, which are not necessarily drawn to scale:

FIG. 5A depicts a flowchart for a method of operating a pseudonymous identifier encoder according to an embodiment of the disclosure.

FIG. 5B depicts a flowchart for a method of operating a pseudonymous identifier recoder according to an embodiment of the disclosure.

DETAILED DESCRIPTION

Figure 1:
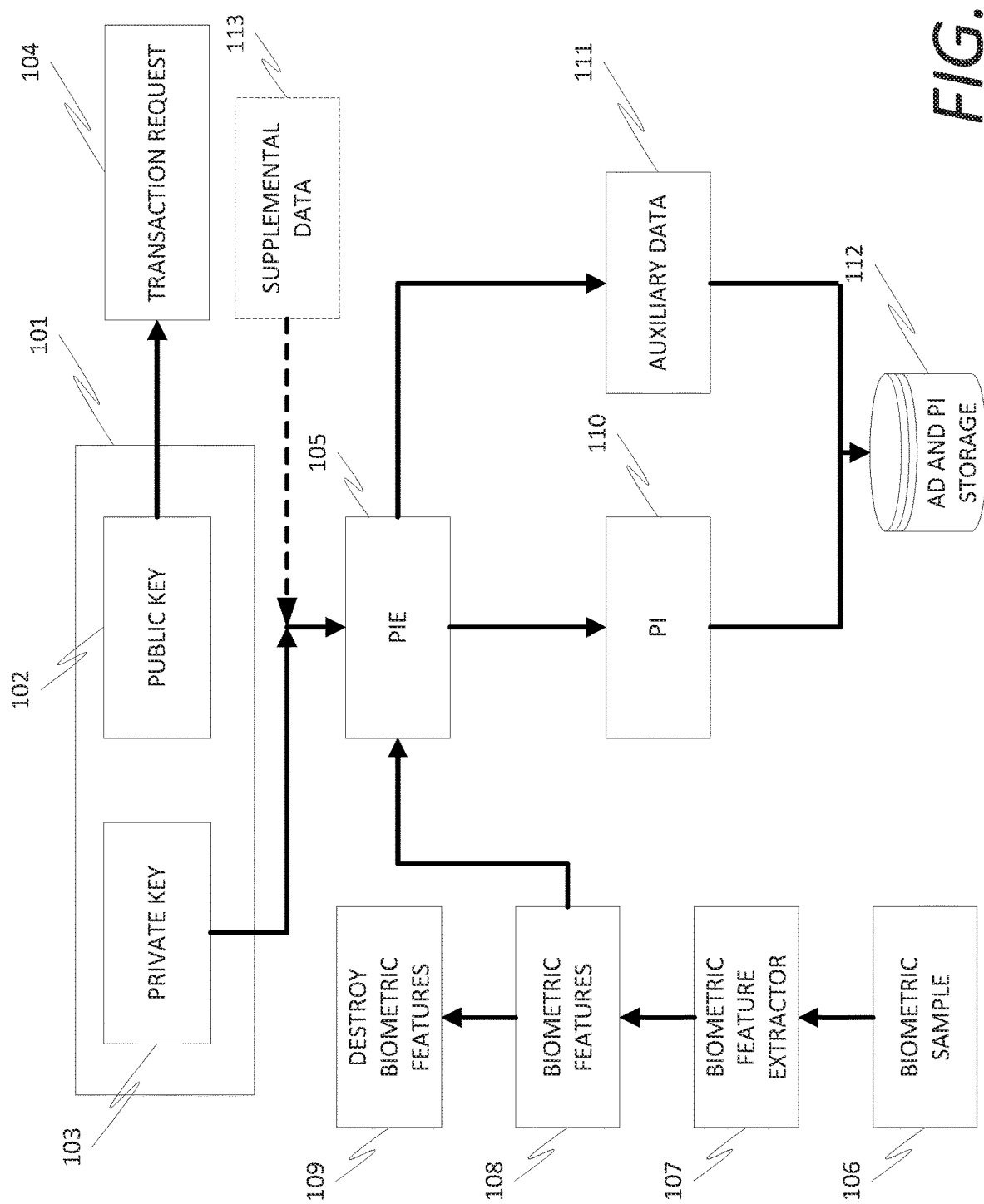
FIG. 1 depicts a flowchart for a method of enrolling a contributor to a blockchain transaction according to an embodiment of the disclosure.

The ensuing description provides embodiments only and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

An exemplary embodiment describes multiple methods to 1) create biometric data and store it in a blockchain transaction such that it may be used in the future to biometrically verify the identity of the contributor of the transaction, and 2) use encoded "live" biometric data to determine whether the blockchain transaction was or was not created by a particular individual. These capabilities can be achieved without including PII or transaction linking data in the blockchain transaction and can be performed in a distributed fashion over a network. One application of this scheme is to encode a private key and use it to satisfy a Public Key Infrastructure (hereinafter "PKI") challenge/response with only a biometric sample.

Successive blockchain transactions are "chained" together cryptographically in series that form "blocks" and distributed across multiple locations. In this way, the database is rendered highly resistant to tampering. Blockchain transactions may comprise a series of block headers, for example serialized in an 80-byte format before being hashed in accordance with an algorithm. The transactions may be broadcast between peers in a serialized byte format.

Biometrics are a technology that use unique features of human physicality (e.g. a biometric source, such as fingerprint image, face image, iris image, hand geometry, hand/finger vein, retina image, DNA, or palm print, or a behavioral characteristic, such as a signature, a gait, or a voice sample, etc.) to create a unique digital "template" made up of biometric features that can be used by computers to help verify or identify a person. For example, a person's fingerprints have features that are statistically unique—that is, while some people may have fingerprints that generate indistinguishable features, such an occurrence is extremely rare. Biometric templates may be compared rapidly by a computer to verify that two or more biometric templates are from the same individual (verification), or to search and identify the biometrics of an individual in a large database (identification). "Biometric information protection" is an application of various algorithms to transform a set of biometric features to a "pseudonymous identifier" (hereinafter "PI") including obfuscated biometric data and optionally other "supplementary data" (hereinafter "SD"). API represents an individual and can be verified by means of a new biometric sample. A PI may not, however, contain any information that would allow retrieval of the biometric features or biometric sample used to create the PI. The SD which may also be used to create the PI may be a PIN code or password. The purpose of biometric information protection is to secure private biometric data in such a way to prevent source data from being extracted and used fraudulently, while enabling the source data to be used to perform biometric comparisons. ISO/IEC 24745, which is incorporated herein by reference in its entirety, is an international standard that defines terms and system models for biometric information protection.

The creation of a PI is a one-way calculation such that the originating biometric features and supplemental data used to create the PI cannot be calculated from the PI, analogously to a hash. The technology enables comparison of obfuscated biometric and supplemental data to determine if the two were derived from the same data. "Auxiliary data" (hereinafter "AD") may be created at the time of the creation of the PI and may be required to perform the comparison. Auxiliary data can be subject-dependent data which may be required to reconstruct a PI during verification. The PI and AD may be separated physically and logically from each other in order to reduce risks to privacy and security of the data. Physically storing the PI and AD on separate storage devices is desirable though not required. As an example, the AD may comprise a secret number encrypted by a key derived from the biometric sample, or may comprise a one-way transformation or public string. The disclosed systems and methods presented herein provide a way to verify and identify contributors to blockchain transactions through the use of biometric information.

In at least one embodiment, a system may include, and a process may be performed by, a memory and processor. The processor may be configured to perform the steps required by the embodiment. A system may also include storage devices and secure file deletion systems.

Embodiments disclosed herein may comprise one or more customer devices, a network, one or more servers, and one or more databases. An overview of an embodiment of the system is illustrated in FIG. 8.

In particular, a user of a client device 804 may operate and utilize the device 804 to enter a biometric sample and/or supplementary data, as discussed below. The client device 804 may be in communication with a network 805 or directly in communication with a server 801 and an external storage device 803 via a communications link 802. Functions involved with performing steps of the embodiment may be performed within the server 801. Alternatively, the steps required for an embodiment of the system may be performed entirely within the user device 804.

Figure 8:
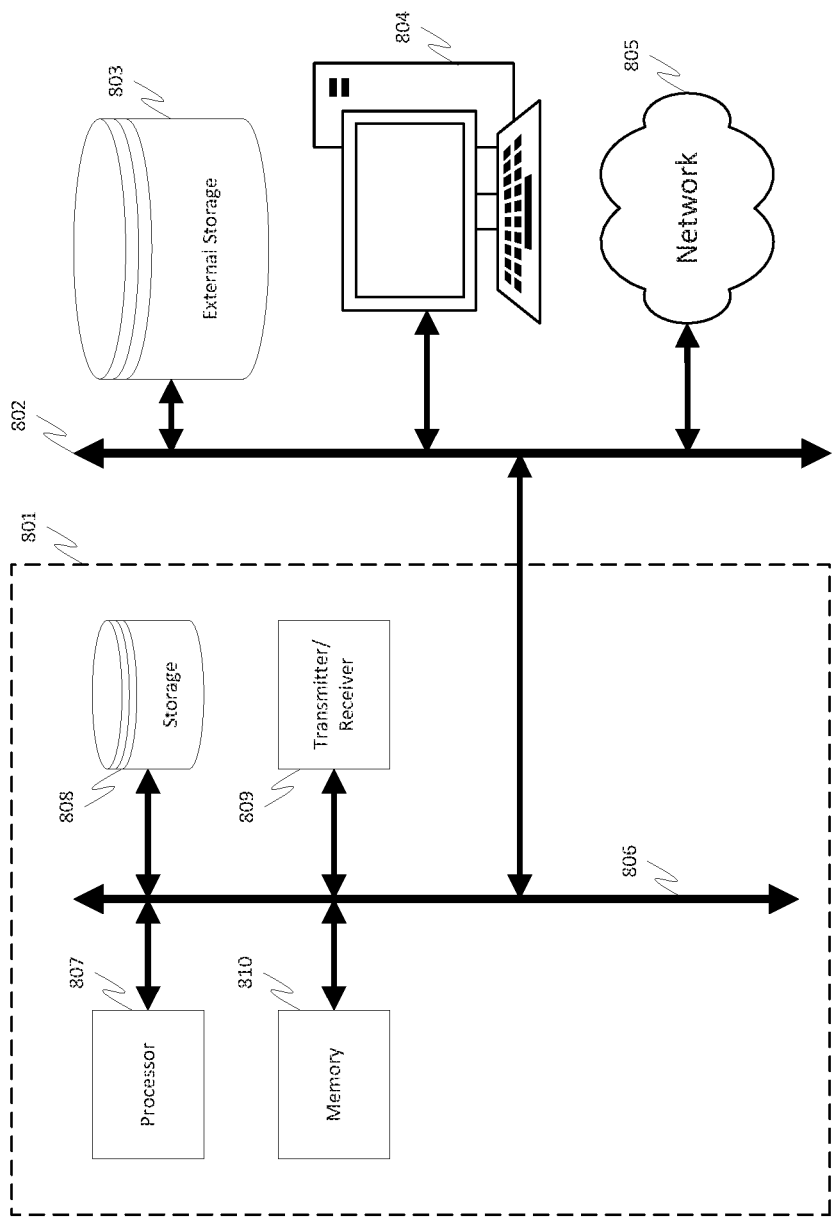
FIG. 8 depicts an example structure of a system enabled to perform blockchain enrolment and verification according to at least one example embodiment.

An example environment comprising a server performing the steps of the system is illustrated in FIG. 8. Server processor 807 may comprise one or more microprocessors, controllers, or other computing devices or resources interconnected via one or more communication links. The processor may operate alone or in conjunction with other components or additional processor(s) of the system described herein.

Processor 807 may be communicatively coupled to memory 810 via an internal link 806. Memory 810 may take the form of volatile or non-volatile memory including, but not limited to, magnetic media, optical media, random access memory (RAM), read-only memory (ROM), removable media, or any other type of memory component. In some embodiments, memory 810 may be internal or external to the processor 807 and may include instructions to perform the steps of embodiments of the system. In some embodiments the server may further comprise a transmitter/receiver 809 used to communicate with external device, i.e. a client device 804, an external storage device 803 and/or a network 805 as well as an internal storage device 808.

The transmitter/receiver 809 may include any necessary hardware and/or software for sending data signals, control signals, etc. to and from external components and the processor 807. Example embodiments contemplate that the transmitter/receiver 809 may be configured as simple output/input ports or more complex transmitter/receiver circuits having drivers and other associated circuitry, such as circuitry for wireless communication. In some embodiments, the transmitter/receiver 809 are configured to transmit and receive, respectively, signals via wired communications to other elements either via a circuit trace (e.g., via a PCB), an IC trace (e.g., an electrical trace or via established in an IC chip), an external wire, or the like.

It should be understood that example embodiments are not limited to the structure of the server 801 shown in FIG. 8. For example, the server 801 may be implemented by a digital state machine comprising digital components such as logic gates. As another example, the server 801 may be implemented as an application specific integrated circuit (ASIC).

Exemplary Method 1: Using Biometrics to Encode Private Key

Referring to FIG. 1, an illustrative embodiment of the present disclosure is shown. The illustrated method proposes a means to biometrically verify the contributor of the message by enabling the contributor to use their biometric (e.g. fingerprint) to encode, store and later decode a private key, which can then be used to satisfy a cryptographic challenge/response against a public key stored in the transaction at the time of its creation. The private key can only be decoded with the use of unique biometric data and optional supplemental data (e.g. PIN) from the contributor, demonstrating that the contributor is in fact the holder of the private key. Verification by means of the method illustrated in FIG. 1 can be performed securely across a network using a standard PKI-based challenge/response exchange. Note that in this method, the contributor might choose to discard the unencoded private key for extra security, or alternatively keep the original private key but use the biometrically encoded key in the event that the unencoded key is lost or stolen.

This method solves a critical problem with blockchain based systems that otherwise rely on secure storage, maintenance, and use of private crypto-keys that are paired with public keys stored in a blockchain transaction for the purpose of claiming association with the transaction.

"Digital wallets" are offered to help manage and protect private keys, but loss of a private key by theft, fraud, breach, computer hardware or software failure, user error, or some other means can cause a loss to the contributor to the blockchain transaction of whatever value or privileges are represented by the blockchain transaction.

The method proposed at least enables a contributor to use a biometrically encoded private key in place of—or as a back up to—the private key. The exemplary method allows a contributor to either a) dispose of their unencoded private key, or b) preserve the unencoded private key by traditional means and use the biometrically encoded key as a backup. The biometrically encoded key may be revealed (and only revealed) by submitting a biometric sample.

A differentiating feature of this method over other existing or more obvious methods is that the technique allows the blockchain transaction contributor to verify their association with a blockchain transaction using only their biometrics (e.g. their fingerprint) in the event their private key is lost or stolen.

Further differentiating this method is the ability it affords to a blockchain contributor to protect their claim to the contributed transaction by a) requiring a unique biometric to reveal their private key and b) avoid storing any sensitive data (e.g. unencoded private key, raw biometric image or template data) that is of potential use and possibly accessible to a fraudster without presentation of a biometric source (e.g., fingerprint).

Further differentiating this method, the private key is encoded in such a way that the contributor can add additional security to the encoding by requiring supplemental data such as a PIN for decoding. The method involves two exemplary processes: 1) enrolment and 2) verification. The enrolment process may be used to create a PI with a private key and biometric features by a contributor when making a transaction request in a transaction ledger. This PI may be stored in a secure storage and used later to verify the identity of a contributor to the transaction ledger in the verification process.

Figure 6A:
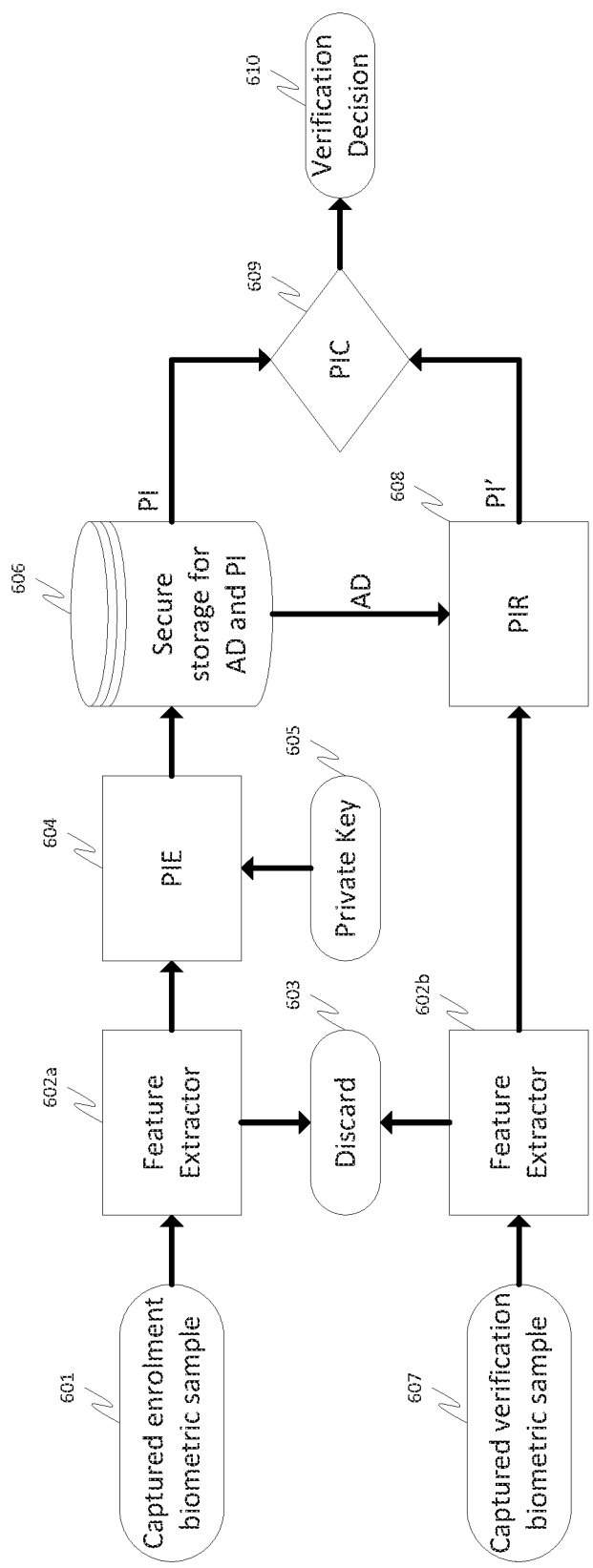
FIG. 6A depicts an overview flowchart for a method of enrolling and verifying a contributor to a blockchain transaction according to an embodiment of the disclosure.

An overview of the enrolment and verification processes of this embodiment is illustrated in FIG. 6A. As can be appreciated from the figure, and as discussed in more detail below, an enrolment biometric sample is captured 601, biometric features are extracted 602a and input into a PIE 604. The biometric data may be later discarded 603 for security purposes. The PIE 604 is also provided a private key 605 and outputs AD and PI which are stored in a secure storage system 606. For verification, a new biometric sample is captured 607 from the user seeking verification. The biometric features are extracted 602b and later discarded 603. The biometric features and AD are input into a PIR 608 resulting in a PI'. The PI and PI' are then compared by a PIC 609 resulting in a verification decision 610.

Enrolment

An exemplary enrolment process of the embodiment is illustrated in FIG. 1 and may comprise the following subsystems: public/private key generation subsystem 101; biometric capture subsystem 106; biometric feature extractor subsystem 107; pseudonymous identifier encoder (PIE) subsystem 105; secure data storage subsystem 112; blockchain transaction generator subsystem 104; and secure file deletion subsystem 109.

The enrolment process begins with the generation of a public/private key pair 101, comprising a public key 102 and a private key 103. In effect, an asymmetrical encryption system is created, wherein the public key 102 is intended to be generally known and or available to persons other than the contributor, while the private key 103 is intended to be kept private and known only to the contributor. A number of asymmetric encryption systems may be used, for example the RSACryptoServiceProvider and DSACryptoServiceProvider provided by the .NET Framework. The private key 103, after being used in the enrolment process to create a pseudonymous identifier should be either stored in a secure storage device, destroyed, or otherwise kept secret.

The public/private key pair 101 is used to amend and encrypt a transaction request 104. The transaction request 104 may be a transaction message or other encrypted entry in a transaction ledger.

Next, a biometric sample 106 is captured and optionally Supplemental Data (hereinafter "SD") 113 is collected. SD 113 may comprise a PIN or password or some other means of securing data. A biometric feature extractor 107 may be used to derive biometric features 108 from the biometric sample 106. The biometric feature extractor 107 may comprise a series of subsystems, for example a biometric data capture subsystem (devices or sensors for collecting and converting biometric signals into biometric samples), a signal processing subsystem (a device for extracting data from biometric samples), and a data storage subsystem.

A pseudonymous identifier encoder (hereinafter "PIE") 105 may be used to derive a PI 110 and generate auxiliary data (hereinafter "AD") 111 from the biometric features 108, the private key 103 and optionally the SD 113. During enrolment, the PIE 105 may receive as input the biometric features 108, the private key 103, and optionally the SD 113. As illustrated in FIG. 5A, the PIE 105 utilizes an embed function 501 to combine the inputs 108, 103, and optionally 113. The output of the embed function 501 is then transformed through a cryptographic one-way function 502 which outputs the pseudonymous identifier 110 as well as the auxiliary data 111. By using a one-way function 502, the PIE should in theory be difficult to invert. Reconstructing the biometric features 108, the private key 103 and/or the SD 113 may be possible through only brute force methods.

Finally, the biometric sample 106, features 108 and optionally the private key 103 may be securely stored or destroyed 109. The PI 110 and AD 111 and optionally the private key 103 may be stored in a secure storage system 112.

Verification

Figure 2:
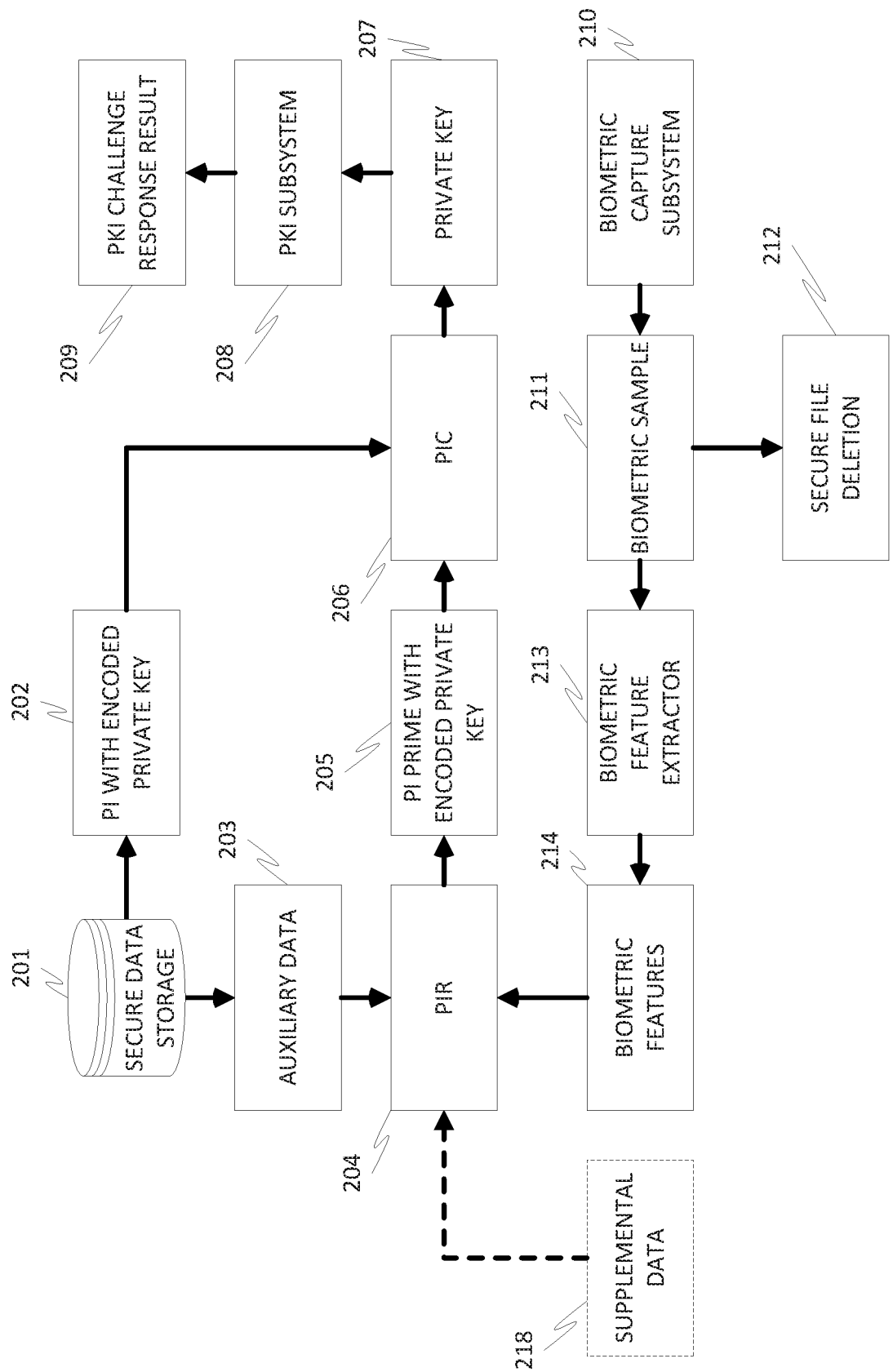
FIG. 2 depicts a flowchart for a method of verifying a contributor to a blockchain transaction according to an embodiment of the disclosure.

An exemplary verification process of an embodiment is illustrated in FIG. 2 and may comprise the following subsystems: biometric capture subsystem 210; biometric feature extractor subsystem 213; pseudonymous identifier recoder (PIR) subsystem 204; pseudonymous identifier comparator (PIC) subsystem 206; secure data storage subsystem 201; secure file deletion subsystem 212; and PKI subsystem 208.

The verification process begins with the capturing of a biometric sample 211 with a biometric capture subsystem 210 and optional Supplemental Data (SD) 218 (e.g., PIN) for verification.

The biometric sample, as in the enrolment process discussed above, may be captured via the use of a biometric capture subsystem. A biometric feature extractor 213 may be used to derive biometric features 214 from the biometric sample 211. The biometric feature extractor 213 may comprise a series of subsystems, for example a biometric data capture subsystem (devices or sensors for collecting and converting biometric signals into biometric samples), a signal processing subsystem (a device for extracting data from biometric samples), and a data storage subsystem.

The optional SD 218 may be entered by the user seeking to be verified as contributor via a GUI of a computer device or a keypad or some other data entry device. The SD 218 may comprise a PIN or password or another conventional type of user-specific data.

In order to create a pseudonymous identifier prime with encoded private key 205—which may be compared to the pseudonymous identifier with encoded private key 202 to verify the biometric features 214 obtained during the verification process—auxiliary data 203 associated with the PI 202 is obtained from the secure data storage subsystem 201 and encoded with the biometric features 214 and optionally supplemental data (hereinafter "SD") 218 with a Pseudonymous Identifier Recoder (hereinafter "PIR") Subsystem 204. The PIR 204 uses the AD 203, the biometric features 214, and optionally SD 218 to create a pseudonymous identifier prime (hereinafter "PI'") 205.

An example PIR 204 is illustrated in FIG. 5B and operates similarly to the PIE of FIG. 5A, discussed above. The PIR, however, embeds the biometric features 214 and optional 218 not with a private key, but with the auxiliary data 203 obtained from the data storage system 201. After embedding AD 203, biometric features 214, and optionally SD 218 with the embed function 503, the output of the embed function 503 is input into a cryptographic one-way function 504 which outputs the PI' 205. By using a one-way function 504, the PIR should in theory be difficult to invert. Reconstructing the biometric features 214, the auxiliary data 203 and optionally the SD 218 may be possible through only brute force methods. The output PI' 205 should, if the biometric features 214 match the biometric features used in the enrolment process, match the PI 202 associated with the auxiliary data 203.

The biometric sample 211 and features 214 used in the verification process may be discarded and destroyed with a secure file deletion system 212 for security purposes.

After obtaining the PI' 205, a pseudonymous identifier comparator (PIC) 206 may be used to compare PI 202 and PI' 205. With a match, the private key 207 is revealed, thus verifying the donor of the biometric sample 211. Successful release of private key 207 encoded in PI 202 indicates that the source of biometric sample 211 verified is the same as the one used to enroll. This private key 207 may then be used to satisfy a PKI challenge through a PKI subsystem 208 resulting in a PKI challenge response result 209.

Exemplary Method 2: Biometric Verification as Supplement to PKI

Figure 3:
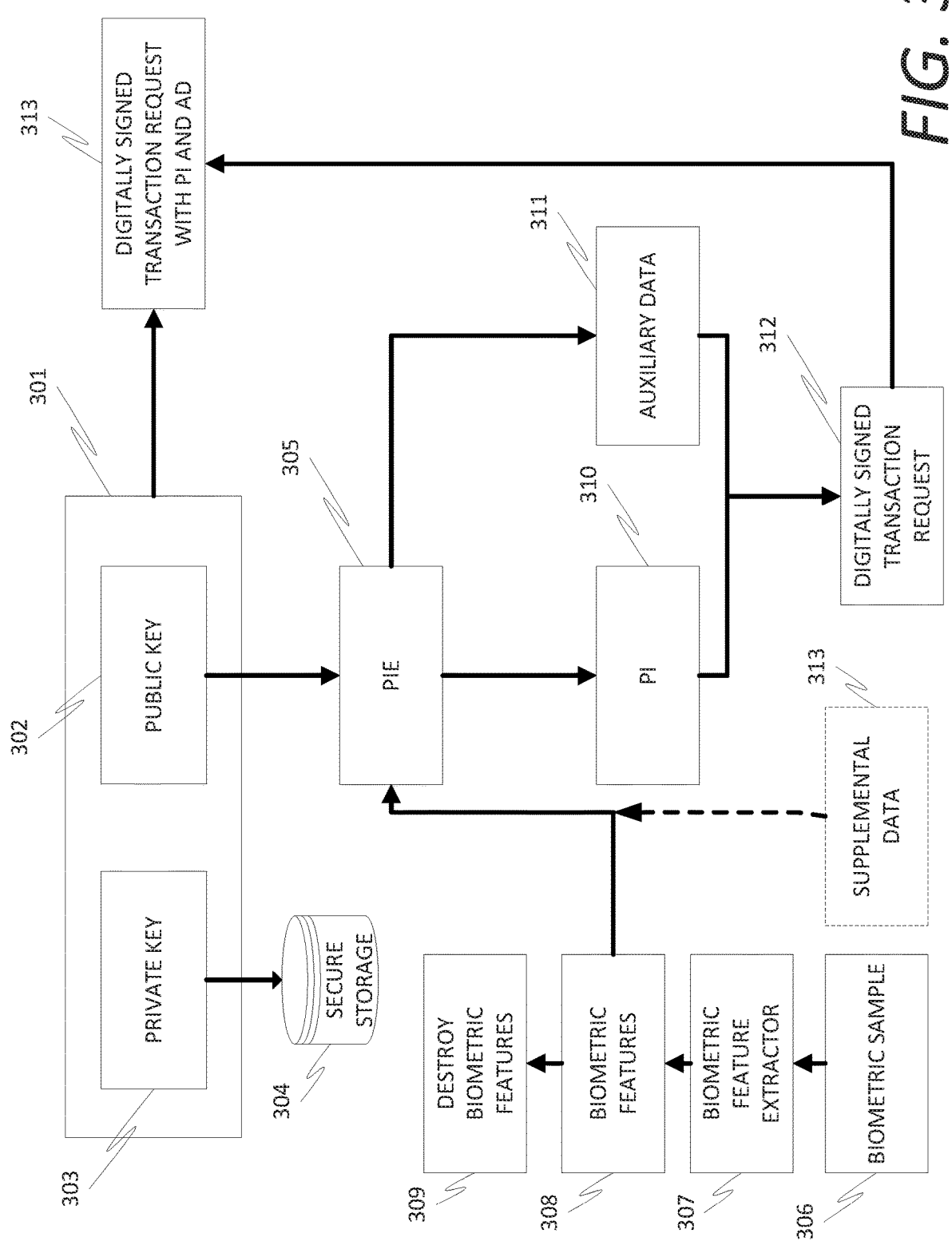
FIG. 3 depicts a flowchart for a method of enrolling a contributor to a blockchain transaction according to an embodiment of the disclosure.
Figure 4:
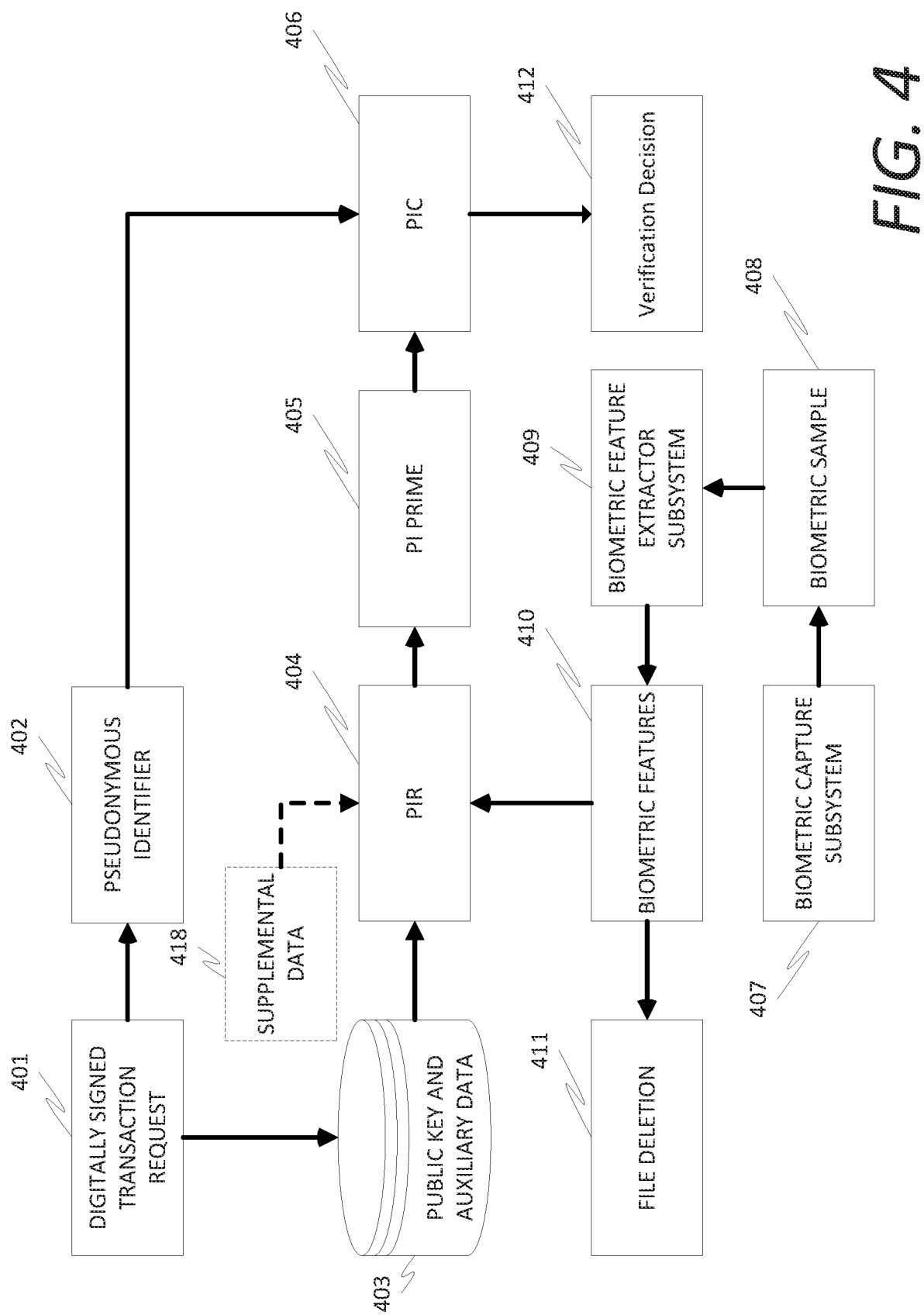
FIG. 4 depicts a flowchart for a method of verifying a contributor to a blockchain transaction according to an embodiment of the disclosure.

A second illustrative embodiment is shown in FIGS. 3 and 4. FIG. 3 illustrates an embodiment of the enrollment process of this second illustrative embodiment. FIG. 4 illustrates an embodiment of the verification process of this second illustrative embodiment. This second embodiment proposes a means to biometrically verify the identity of the contributor of the transaction by enabling the contributor to use their biometrics in parallel to the aforementioned mechanism requiring PKI. This method requires that the Pseudonymous Identifier (PI) 310 be stored in the blockchain transaction request, and the associated Auxiliary Data (AD) 311 be securely stored and preserved in a separate database, ideally by the blockchain database administrator. The PI 310 stored in the blockchain transaction and the separately stored AD 311 can be used to biometrically verify the identity of the contributor. This is useful if the contributor has lost their private key, or if there is a need to verify the identity of the user of the private key. Upon an attempt to verify the identity of the contributor of the transaction, a live biometric sample is captured and encoded using the auxiliary data, and the result is compared to the PI in the transaction. A match demonstrates that the live biometric is from the same person who created the PI stored in the blockchain transaction. This method can be performed even if the contributor loses their private key.

This method solves a critical problem with blockchain based systems that otherwise rely on secure storage, maintenance, and use of private crypto-keys that are paired with public keys stored in a blockchain transaction for the purpose of claiming association with the transaction.

"Digital wallets" are offered to help manage and protect private keys. But loss of a private key by theft, fraud, breach, computer hardware or software failure, user error, or some other means can cause a loss to the contributor to the blockchain transaction of whatever value or privileges are represented by the blockchain transaction.

The method proposed enables a contributor to add a biometric key (Pseudonymous Identifier) to a blockchain transaction as a back up to the public key. The key serves to verify the identity of the creator of the biometric key upon comparison with a live biometric sample.

A differentiating feature of this method over other existing or more obvious methods is that it allows the blockchain transaction contributor to verify their association with a blockchain transaction using only their biometrics (e.g. their fingerprint) in the event their private key is lost or stolen.

Further differentiating this method is the ability it affords to a blockchain contributor to protect their claim to the contributed transaction by a) requiring a unique biometric to reveal their private key and b) avoid storing any sensitive data (e.g. unencoded private key, raw biometric image or template data) that is of potential use to a fraudster without presentation of a biometric source (e.g. fingerprint).

Further differentiating this method, the private key is encoded in such a way that the contributor can add additional security to the encoding by requiring supplemental data such as a PIN for decoding.

Figure 6B:
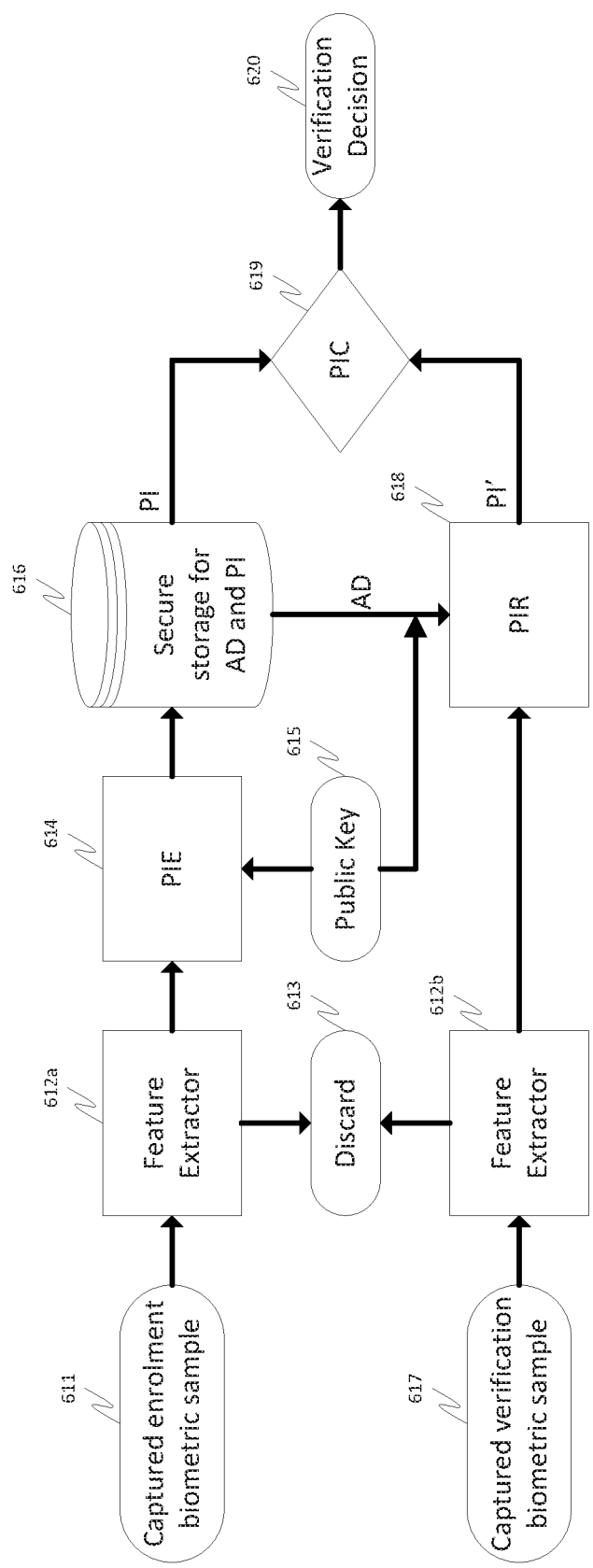
FIG. 6B depicts an overview flowchart for a method of enrolling and verifying a contributor to a blockchain transaction according to an embodiment of the disclosure.

An overview of the enrolment and verification processes of this embodiment is illustrated in FIG. 6B. As can be appreciated from the figure, and as discussed in more detail below, an enrolment biometric sample is captured 611, biometric features are extracted 612a and input into a PIE 614. The biometric data may be discarded 613 for security purposes. The PIE 614 is also provided a public key 615 and outputs AD and PI which are stored in a secure storage system 616. For verification, a new biometric sample is captured 617 from the user seeking verification. The biometric features are extracted 612b and later discarded 613. The biometric features, public key 615 and AD are input into a PIR 618 resulting in a PI'. The PI and PI' are then compared by a PIC 619 resulting in a verification decision 620.

Enrolment

The exemplary enrolment system of the embodiment is illustrated in FIG. 3 and comprises the following subsystems:

Biometric capture subsystem 306
Biometric feature extractor subsystem 307
Pseudonymous identifier encoder (PIE) subsystem 305
Secure data storage subsystem 304
Blockchain transaction generator subsystem 312
Secure file deletion subsystem 309

The enrolment process involves the following exemplary steps:

The enrolment process begins with the generation, by a contributor, of a public/private key pair 301, comprising a public key 302 and a private key 303. In effect, an asymmetrical encryption system is created, wherein the public key 302 is intended to be generally known and or available to persons other than the contributor, while the private key 303 is intended to be kept private and known only to the contributor. In this embodiment, however, the private key 303 may be destroyed or otherwise lost, as the private key 303 is not required for the verification process. A number of asymmetric encryption systems may be used, including the RSACryptoServiceProvider and DSACryptoServiceProvider provided by the .NET Framework. The private key 303 should be either stored in a secure storage device, destroyed, or otherwise kept secret.

The public/private key pair 301 is used to amend and encrypt a transaction request 313. The transaction request 313 may be a transaction message or other encrypted entry in a transaction ledger.

Next, a biometric sample 306 is captured and optionally Supplemental Data (hereinafter "SD") 313 is collected. SD 313 may comprise a PIN or password or some other means of securing data. A biometric feature extractor 307 may be used to derive biometric features 308 from the biometric sample 306. The biometric feature extractor 307 may comprise a series of subsystems, for example a biometric data capture subsystem (devices or sensors for collecting and converting biometric signals into biometric samples), a signal processing subsystem (a device for extracting data from biometric samples), and a data storage subsystem. After being used in the enrolment process, the biometric features 308 and biometric sample 306 should be securely destroyed 309.

Figure 7A:
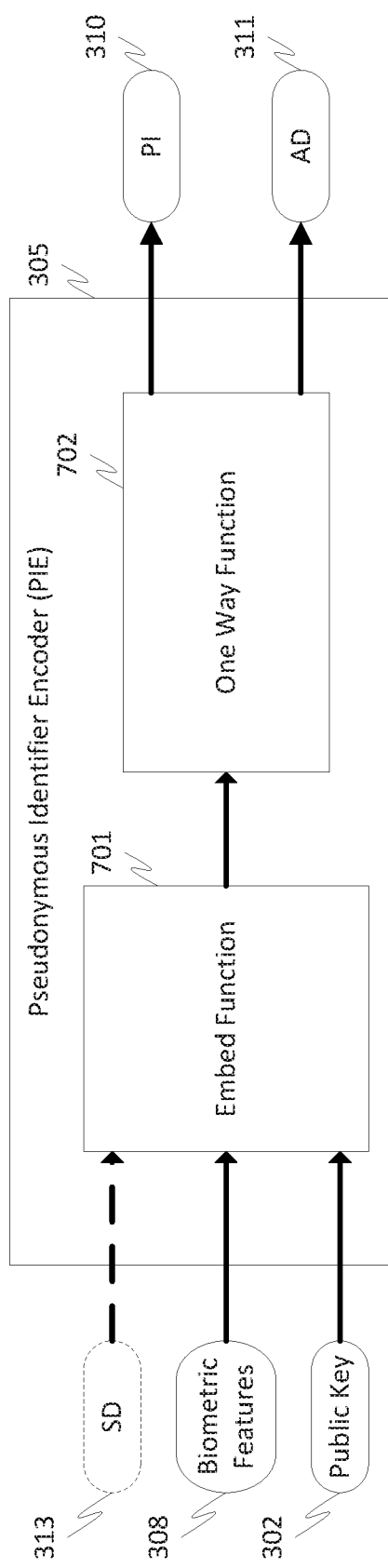
FIG. 7A depicts a flowchart for a method of operating a pseudonymous identifier encoder according to an embodiment of the disclosure.

A pseudonymous identifier encoder (hereinafter "PIE") 305 may be used to derive a PI 310 and generate auxiliary data (hereinafter "AD") 311 from the biometric features 308 and optionally the SD 313. During enrolment, the PIE 305 may receive as input the biometric features 308 and optionally the SD 313. As illustrated in FIG. 7A, the PIE 305 utilizes an embed function 701 to combine the input biometric features 308, public key 302, and optionally SD 313. The output of the embed function 701 is then transformed through a cryptographic one-way function 702 which outputs the pseudonymous identifier 310 as well as the auxiliary data 311. By using a one-way function 702, the PIE 305 should in theory be difficult to invert. Reconstructing the biometric features 308 and/or the SD 313 may be possible through only brute force methods.

In this embodiment, the PI 310 and AD 311 are used to amend transaction the transaction request 312 which is used in association with the public key 302 to digitally sign the transaction request 313.

Finally, the biometric sample 306, features 308 and optionally the private key 303 may be securely stored or destroyed 309. The PI 310 and AD 311 and optionally the private key 303 may be stored in a secure storage system 312.

Verification

The exemplary verification system of the embodiment is illustrated in FIG. 4 and comprises the following subsystems: Biometric capture subsystem 407; Biometric feature extractor subsystem 409; Pseudonymous identifier recoder (PIR) subsystem 404; Pseudonymous identifier comparator (PIC) subsystem 406; Blockchain transaction reader subsystem 401; and Secure file deletion subsystem 411.

The verification process begins with the capturing of a biometric sample 408 with a biometric capture subsystem 407 and the optional entry of Supplemental Data (SD) 418 (e.g. PIN) for verification.

The biometric sample 408, as in the enrolment process discussed above, may be captured via the use of a biometric capture subsystem 407. A biometric feature extractor 409 may be used to derive biometric features 410 from the biometric sample 408. The biometric feature extractor 409 may comprise a series of subsystems, for example a biometric data capture subsystem (devices or sensors for collecting and converting biometric signals into biometric samples), a signal processing subsystem (a device for extracting data from biometric samples), and a data storage subsystem.

The optional SD 418 may be entered by the user seeking to be verified as contributor via a GUI of a computer device or a keypad or some other data entry device. The SD 418 may comprise a PIN or password or other conventional type of user-specific data.

In order to create a pseudonymous identifier prime 405—which may be compared to the pseudonymous identifier 402 to verify the biometric features 410 obtained during the verification process—the public key and auxiliary data 403 associated with the PI 402 are obtained from a digitally signed transaction request 401 and may be encoded with the biometric features 410 and optionally supplemental data (hereinafter "SD") 418 by a Pseudonymous Identifier Recoder (hereinafter "PIR") Subsystem 404. The PIR 404 uses the public key and auxiliary data 403, the biometric features 414, and optionally SD 418 to create a pseudonymous identifier prime (hereinafter "PI'") 405.

Figure 7B:
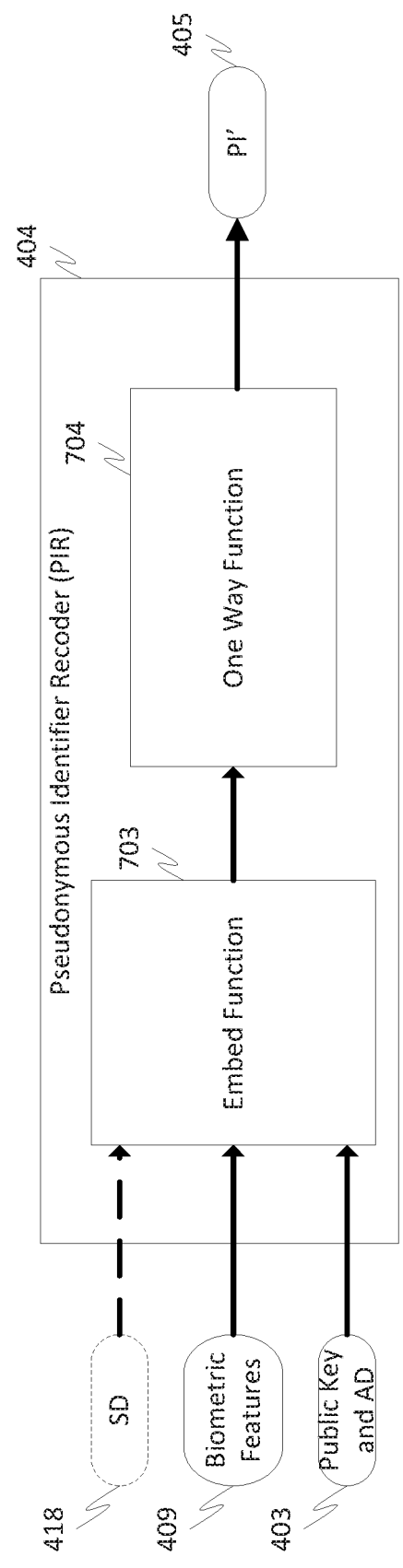
FIG. 7B depicts a flowchart for a method of operating a pseudonymous identifier recoder according to an embodiment of the disclosure.

An example PIR 404 is illustrated in FIG. 7B and operates similarly to the PIE of FIG. 7A, discussed above. The PIR, however, embeds the biometric features 414, optionally the SD 418, and the public key and auxiliary data 403. After embedding the public key and auxiliary data 403, biometric features 414, and optionally the SD 418 with the embed function 703, the output of the embed function 703 is input into a cryptographic one-way function 704 which outputs the PI' 405. By using a one-way function 704, the PIR should in theory be difficult to invert. Reconstructing the biometric features 414, the public key and auxiliary data 403 and optionally the SD 418 may be possible through only brute force methods. The output PI' 405 should, if the biometric features 414 match the biometric features used in the enrolment process, match the PI 402 associated with the public key and auxiliary data 403.

The biometric sample 408 and features 410 used in the verification process may be discarded and/or destroyed with a secure file deletion system 411 for security purposes.

After obtaining the PI' 405, a pseudonymous identifier comparator subsystem (PIC) 406 may be used to compare PI 402 and PI' 405 resulting in a verification decision 412. With a match, the donor of the biometric sample 408 is verified, indicating that the source of biometric sample 408 is the same as the one used to enroll.

Exemplary aspects are directed toward:

A method of enrolling a contributor to a blockchain transaction, the method comprising:
generating a public/private key pair, wherein the public/private key pair comprises a public key and a private key;
obtaining a first biometric sample;
generating a first set of biometric features from the first biometric sample;
generating a pseudonymous identifier and auxiliary data, comprising using a pseudonymous identifier encoder to embed the first set of biometric features with the private key;
using the public key to amend a blockchain transaction request; and
verifying the blockchain transaction request by retrieving the private key, wherein the private key is retrieved by obtaining a second biometric sample and decoding the pseudonymous identifier with a second set of biometric features generated from the second biometric sample.

Any of the above aspects, further comprising:
determining the first set of biometric features matches the second set of biometric features; and
based on the determination, verifying an identity of the contributor.

Any of the above aspects, wherein determining the first set of biometric features matches the second set of biometric features comprises:
generating a pseudonymous identifier prime, comprising using a pseudonymous identifier recoder to embed the second set of biometric features with the auxiliary data; and
comparing the pseudonymous identifier prime with the pseudonymous identifier.

Any of the above aspects, wherein the pseudonymous identifier encoder further embeds the first set of biometric features with the private key and a first supplemental data.

Any of the above aspects, wherein generating the pseudonymous identifier further comprises using a one-way function to cryptographically secure the pseudonymous identifier.

Any of the above aspects, wherein the pseudonymous identifier recoder further embeds the second set of biometric features with the auxiliary data and a second supplemental data.

Any of the above aspects, further comprising:
determining the pseudonymous identifier prime matches the pseudonymous identifier; and
after determining the pseudonymous identifier prime matches the pseudonymous identifier, releasing the private key.

A method of enrolling a contributor to a blockchain transaction, the method comprising:
generating a public/private key pair, wherein the public/private key pair comprises a public key and a private key;
obtaining a first biometric sample;
generating a first set of biometric features from the first biometric sample;
generating a pseudonymous identifier and auxiliary data, comprising using a pseudonymous identifier encoder to embed the first set of biometric features with the public key;
amending a blockchain transaction request with one or more of the pseudonymous identifier and auxiliary data;
using the public key to sign the blockchain transaction request;
verifying the blockchain transaction request by:
obtaining a second biometric sample,
generating a second set of biometric features from the second biometric sample;
generating a pseudonymous identifier prime from the second set of biometric features; and
comparing the pseudonymous identifier with the pseudonymous identifier prime.

Any of the above aspects, further comprising:
determining the pseudonymous identifier matches the pseudonymous identifier prime; and
based on the determination, verifying an identity of the contributor.

Any of the above aspects, wherein determining the pseudonymous identifier matches the pseudonymous identifier prime comprises using a pseudonymous identifier recoder to embed the second set of biometric features with the public key and auxiliary data.

Any of the above aspects, wherein the pseudonymous identifier encoder further embeds the first set of biometric features with the public key and a first supplemental data.

Any of the above aspects, wherein generating the pseudonymous identifier further comprises using a one-way function to cryptographically secure the pseudonymous identifier.

Any of the above aspects, wherein the pseudonymous identifier recoder further embeds the second set of biometric features with the public key, the auxiliary data and a second supplemental data Any of the above aspects, further comprising:
determining the pseudonymous identifier prime matches the pseudonymous identifier; and
after determining the pseudonymous identifier prime matches the pseudonymous identifier, making a verification decision.

A system for enrolling a contributor to a blockchain transaction, the system comprising:
a server comprising:
a memory;
a processor in communication with the memory, wherein the processor:
generates a public/private key pair, wherein the public/private key pair comprises a public key and a private key;
obtains a first biometric sample;
generates a first set of biometric features from the first biometric sample;
generates a pseudonymous identifier and auxiliary data, comprising using a pseudonymous identifier encoder to embed the first set of biometric features with the private key;
uses the public key to amend a blockchain transaction request; and
verifies the blockchain transaction request by retrieving the private key, wherein the private key is retrieved by obtaining a second biometric sample and decoding the pseudonymous identifier with a second set of biometric features generated from the second biometric sample.

Any of the above aspects, wherein the processor:
determines the first set of biometric features matches the second set of biometric features; and
based on the determination, verifies an identity of the contributor.

Any of the above aspects, wherein verifying the identity comprises the processor:
generating a pseudonymous identifier prime, comprising using a pseudonymous identifier recoder to embed the second set of biometric features with the auxiliary data; and
comparing the pseudonymous identifier prime with the pseudonymous identifier.

Any of the above aspects, wherein the pseudonymous identifier encoder further embeds the first set of biometric features with the private key and a first supplemental data Any of the above aspects, wherein generating the pseudonymous identifier further comprises using a one-way function to cryptographically secure the pseudonymous identifier.

Any of the above aspects, wherein the pseudonymous identifier recoder further embeds the second set of biometric features with the auxiliary data and a second supplemental data.

A system for enrolling a contributor to a blockchain transaction, the system comprising:
means for generating a public/private key pair, wherein the public/private key pair comprises a public key and a private key;
means for obtaining a first biometric sample;
means for generating a first set of biometric features from the first biometric sample;
means for generating a pseudonymous identifier and auxiliary data, comprising using a pseudonymous identifier encoder to embed the first set of biometric features with the private key;
means for using the public key to amend a blockchain transaction request; and
means for verifying the blockchain transaction request by retrieving the private key, wherein the private key is retrieved by obtaining a second biometric sample and decoding the pseudonymous identifier with a second set of biometric features generated from the second biometric sample.

Any of the above aspects, further comprising:
means for determining the first set of biometric features matches the second set of biometric features; and
means for, based on the determination, verifying an identity of the contributor.

Any of the above aspects, wherein determining the first set of biometric features matches the second set of biometric features comprises:
means for generating a pseudonymous identifier prime, comprising using a pseudonymous identifier recoder to embed the second set of biometric features with the auxiliary data; and
means for comparing the pseudonymous identifier prime with the pseudonymous identifier.

Any of the above aspects, further comprising means for embedding the first set of biometric features with the private key and a first supplemental data.

Any of the above aspects, further comprising means for using a one-way function to cryptographically secure the pseudonymous identifier.

Any of the above aspects, further comprising means for embedding the second set of biometric features with the auxiliary data and a second supplemental data.

Any of the above aspects, further comprising:
means for determining the pseudonymous identifier prime matches the pseudonymous identifier; and
means for, after determining the pseudonymous identifier prime matches the pseudonymous identifier, releasing the private key.

A system for enrolling a contributor to a blockchain transaction, the system comprising:
means for generating a public/private key pair, wherein the public/private key pair comprises a public key and a private key;
means for obtaining a first biometric sample;
means for generating a first set of biometric features from the first biometric sample;
means for generating a pseudonymous identifier and auxiliary data, comprising using a pseudonymous identifier encoder to embed the first set of biometric features with the public key;
means for amending a blockchain transaction request with one or more of the pseudonymous identifier and auxiliary data;

means for using the public key to sign the blockchain transaction request;
means for verifying the blockchain transaction request comprising:
  means for obtaining a second biometric sample,
  means for generating a second set of biometric features from the second biometric sample;
  means for generating a pseudonymous identifier prime from the second set of biometric features; and
  means for comparing the pseudonymous identifier with the pseudonymous identifier prime.
Any of the above aspects, further comprising:
  means for determining the pseudonymous identifier matches the pseudonymous identifier prime; and
  means for, based on the determination, verifying an identity of the contributor.
Any of the above aspects, further comprising means for using a pseudonymous identifier recoder to embed the second set of biometric features with the public key and auxiliary data.
Any of the above aspects, further comprising means for embedding the first set of biometric features with the public key and a first supplemental data.
Any of the above aspects, further comprising means for using a one-way function to cryptographically secure the pseudonymous identifier.
Any of the above aspects, further comprising means for embedding the second set of biometric features with the public key, the auxiliary data and a second supplemental data
Any of the above aspects, further comprising:
  means for determining the pseudonymous identifier prime matches the pseudonymous identifier; and
  means for, after determining the pseudonymous identifier prime matches the pseudonymous identifier, making a verification decision.
A computer readable program product comprising:
a non-transitory computer readable storage medium having computer readable program code embodied therewith, the computer readable program code configured, when executed by a processor to perform the steps of:
  generating a public/private key pair, wherein the public/private key pair comprises a public key and a private key;
  obtaining a first biometric sample;
  generating a first set of biometric features from the first biometric sample;
  generating a pseudonymous identifier and auxiliary data, comprising using a pseudonymous identifier encoder to embed the first set of biometric features with the private key;
  using the public key to amend a blockchain transaction request; and
  verifying the blockchain transaction request by retrieving the private key, wherein the private key is retrieved by obtaining a second biometric sample and decoding the pseudonymous identifier with a second set of biometric features generated from the second biometric sample.
Any of the above aspects, further comprising:
determining the first set of biometric features matches the second set of biometric features; and
based on the determination, verifying an identity of the contributor.
Any of the above aspects, wherein determining the first set of biometric features matches the second set of biometric features comprises:
  generating a pseudonymous identifier prime, comprising using a pseudonymous identifier recoder to embed the second set of biometric features with the auxiliary data; and
  comparing the pseudonymous identifier prime with the pseudonymous identifier.
Any of the above aspects, wherein the pseudonymous identifier encoder further embeds the first set of biometric features with the private key and a first supplemental data.
Any of the above aspects, wherein generating the pseudonymous identifier further comprises using a one-way function to cryptographically secure the pseudonymous identifier.
Any of the above aspects, wherein the pseudonymous identifier recoder further embeds the second set of biometric features with the auxiliary data and a second supplemental data.
Any of the above aspects, further comprising:
  determining the pseudonymous identifier prime matches the pseudonymous identifier; and
  after determining the pseudonymous identifier prime matches the pseudonymous identifier, releasing the private key.
A computer readable program product comprising:
a non-transitory computer readable storage medium having computer readable program code embodied therewith, the computer readable program code configured, when executed by a processor to perform the steps of:
  generating a public/private key pair, wherein the public/private key pair comprises a public key and a private key;
  obtaining a first biometric sample;
  generating a first set of biometric features from the first biometric sample;
  generating a pseudonymous identifier and auxiliary data, comprising using a pseudonymous identifier encoder to embed the first set of biometric features with the public key;
  amending a blockchain transaction request with one or more of the pseudonymous identifier and auxiliary data;
  using the public key to sign the blockchain transaction request;
  verifying the blockchain transaction request by:
    obtaining a second biometric sample,
    generating a second set of biometric features from the second biometric sample;
    generating a pseudonymous identifier prime from the second set of biometric features; and
    comparing the pseudonymous identifier with the pseudonymous identifier prime.
Any of the above aspects, further comprising:
  determining the pseudonymous identifier matches the pseudonymous identifier prime; and
  based on the determination, verifying an identity of the contributor.
Any of the above aspects, wherein determining the pseudonymous identifier matches the pseudonymous identifier prime comprises using a pseudonymous identifier recoder to embed the second set of biometric features with the public key and auxiliary data.
Any of the above aspects, wherein the pseudonymous identifier encoder further embeds the first set of biometric features with the public key and a first supplemental data.

Any of the above aspects, wherein generating the pseudonymous identifier further comprises using a one-way function to cryptographically secure the pseudonymous identifier.

Any of the above aspects, wherein the pseudonymous identifier recoder further embeds the second set of biometric features with the public key, the auxiliary data and a second supplemental data Any of the above aspects, further comprising:
determining the pseudonymous identifier prime matches the pseudonymous identifier; and
after determining the pseudonymous identifier prime matches the pseudonymous identifier, making a verification decision.

Any one or more of the aspects as substantially described herein.

In this description, numerous specific details are set forth in order to provide a thorough understanding of the disclosed techniques. However, it will be understood by those skilled in the art that the present techniques may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing," "analyzing," "checking," or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

For purposes of explanation, numerous details are set forth in order to provide a thorough understanding of the present techniques. It should be appreciated however that the present disclosure may be practiced in a variety of ways beyond the specific details set forth herein. Furthermore, while the exemplary embodiments illustrated herein show various components of the system collocated, it is to be appreciated that the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As will be appreciated from the description, and for reasons of computational efficiency, the components of the system can be arranged at any location within a distributed network without affecting the operation of the system. It should also be appreciated that the components of the system can be combined into one or more devices, or split between devices or systems.

Furthermore, it should be appreciated that the various links (which may not be shown connecting the elements), including the communications channel(s)/link connecting the elements, can be wired or wireless links or any combination thereof, or any other known or later developed element(s) capable of supplying and/or communicating data to and from the connected elements. The term module as used herein can refer to any known or later developed hardware, circuit, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

For purposes of explanation, numerous details are set forth in order to provide a thorough understanding of the present embodiments. It should be appreciated however that the techniques herein may be practiced in a variety of ways beyond the specific details set forth herein.

While the above-described flowcharts have been discussed in relation to a particular sequence of events, it should be appreciated that changes to this sequence can occur without materially effecting the operation of the embodiment(s). Additionally, the exact sequence of events need not occur as set forth in the exemplary embodiments. Additionally, the exemplary techniques illustrated herein are not limited to the specifically illustrated embodiments but can also be utilized with the other exemplary embodiments and each described feature is individually and separately claimable.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer arts.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a biometric/blockchain system.

Various embodiments may also or alternatively be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

The invention claimed is:

1. A method of enrolling a contributor to a blockchain transaction, the method comprising:
generating a public/private key pair, wherein the public/private key pair comprises a public key and a private key;
obtaining a first biometric sample;
generating a first set of biometric features from the first biometric sample;
generating a pseudonymous identifier and auxiliary data, comprising using a pseudonymous identifier encoder to embed the first set of biometric features with the public key;
amending a blockchain transaction request with one or more of the pseudonymous identifier and auxiliary data;
using the public key to sign the blockchain transaction request;
verifying the blockchain transaction request by:
obtaining a second biometric sample, generating a second set of biometric features from the second biometric sample;
generating a pseudonymous identifier prime from the second set of biometric features; and
comparing the pseudonymous identifier with the pseudonymous identifier prime.

2. The method of claim 1, further comprising:
determining whether the pseudonymous identifier matches the pseudonymous identifier prime; and
based on the determination, verifying an identity of the contributor.

3. The method of claim 2, wherein determining whether the pseudonymous identifier matches the pseudonymous identifier prime comprises using a pseudonymous identifier recoder to embed the second set of biometric features with the public key and auxiliary data.

4. The method of claim 1, wherein the pseudonymous identifier encoder further embeds the first set of biometric features with the public key and a first supplemental data.

5. The method of claim 1, wherein generating the pseudonymous identifier further comprises using a one-way function to cryptographically secure the pseudonymous identifier.

6. The method of claim 3, wherein the pseudonymous identifier recoder further embeds the second set of biometric features with the public key, the auxiliary data and a second supplemental data.

7. The method of claim 3, further comprising:
determining whether the pseudonymous identifier prime matches the pseudonymous identifier; and
after determining the pseudonymous identifier prime matches the pseudonymous identifier, making a verification decision.

* * * * *